US010097994B2

(12) United States Patent
Burch et al.

(10) Patent No.: US 10,097,994 B2
(45) Date of Patent: Oct. 9, 2018

(54) MOBILE TOUCH AUTHENTICATION REFRESH

(71) Applicant: NetIQ Corporation, Provo, UT (US)

(72) Inventors: Lloyd Leon Burch, Payson, UT (US);
Michael F. Angelo, Spring, TX (US);
Baha Masoud, Orem, UT (US)

(73) Assignee: NetIQ Corporation, Provo, UT (US)

( * ) Notice: Subject to any disclaimer, the term of this patent is extended or adjusted under 35 U.S.C. 154(b) by 0 days.

(21) Appl. No.: 15/068,772

(22) Filed: Mar. 14, 2016

(65) Prior Publication Data

US 2016/0286397 A1   Sep. 29, 2016

Related U.S. Application Data

(63) Continuation of application No. 13/781,383, filed on Feb. 28, 2013, now Pat. No. 9,288,669.

(51) Int. Cl.
*H04W 12/06* (2009.01)
*G06F 21/31* (2013.01)
*G06F 3/041* (2006.01)

(52) U.S. Cl.
CPC .......... *H04W 12/06* (2013.01); *G06F 3/0416* (2013.01); *G06F 21/31* (2013.01); *G06F 21/316* (2013.01)

(58) Field of Classification Search
CPC ....................................................... G06F 21/32
See application file for complete search history.

(56) References Cited

U.S. PATENT DOCUMENTS

| 6,636,973 | B1 | 10/2003 | Novoa et al. |
| 7,593,000 | B1 | 9/2009 | Chin |
| 8,174,503 | B2 | 5/2012 | Chin |
| 9,288,669 | B2 | 3/2016 | Burch et al. |
| 2003/0103658 | A1 | 6/2003 | Pan et al. |
| 2003/0112182 | A1 | 6/2003 | Bajikar |
| 2004/0148526 | A1 | 7/2004 | Sands et al. |
| 2008/0114771 | A1 | 5/2008 | Welingkar et al. |
| 2009/0058832 | A1 | 3/2009 | Newton |
| 2009/0113543 | A1* | 4/2009 | Adams ............... G06F 21/33 726/18 |
| 2009/0133117 | A1* | 5/2009 | Bentley ............. H04L 63/0846 726/17 |

(Continued)

OTHER PUBLICATIONS

"Real Disney Magic: Gadgets That Know Who You Are, Just by Touch", [Online]. Retrieved from the Internet: <URL: http://www.fastcodesign.com/1670952/real-disney-magic-gadgets-that-know-who-you-are-just-by-touch#1>, (Oct. 8, 2012).

*Primary Examiner* — Kathy Wang-Hurst
*Assistant Examiner* — Ernest Tacsik
(74) *Attorney, Agent, or Firm* — Schwegman Lundberg & Woessner, P.A.

(57) ABSTRACT

Techniques for resetting authentication for touch-enabled devices are presented. When a user authenticates to a mobile device a touch profile (TP) is recorded. Each subsequent time the user unlocks a locked mobile device via touch, a new TP is noted. The new TP is compared to the recorded TP and if the deviation is within an acceptable tolerance, the user is permitted access to the mobile device without re-authentication. When the new TP is not within the acceptable tolerance of the recorded TP, the user is forced to re-authenticate before access is granted to the mobile device.

18 Claims, 4 Drawing Sheets

(56) References Cited

U.S. PATENT DOCUMENTS

| | | | |
|---|---|---|---|
| 2009/0150993 A1* | 6/2009 | Tilley | G06F 21/32 |
| | | | 726/19 |
| 2009/0165121 A1 | 6/2009 | Kumar | |
| 2009/0176566 A1* | 7/2009 | Kelly | G07F 17/32 |
| | | | 463/29 |
| 2010/0009658 A1* | 1/2010 | Wu | H04M 1/673 |
| | | | 455/411 |
| 2010/0295794 A1* | 11/2010 | Russ | G06F 1/1626 |
| | | | 345/173 |
| 2011/0153497 A1 | 6/2011 | Determan | |
| 2011/0248773 A1 | 10/2011 | Poupyrev et al. | |
| 2012/0046012 A1 | 2/2012 | Forutanpour et al. | |
| 2012/0105200 A1* | 5/2012 | Yoo | G06F 21/32 |
| | | | 340/5.82 |
| 2012/0162144 A1 | 6/2012 | Fahraeus et al. | |
| 2013/0127592 A1* | 5/2013 | Fyke | G06F 21/32 |
| | | | 340/5.53 |
| 2014/0242949 A1 | 8/2014 | Burch et al. | |

* cited by examiner

MOBILE TOUCH AUTHENTICATION REFRESH

This application is a continuation of U.S. patent application Ser. No. 13/781,383, filed Feb. 28, 2013, now issued as U.S. Pat. No. 9,288,669 which is incorporated herein by reference in its entirety.

BACKGROUND

As the industry increases the use of mobile devices, security is becoming a growing concern because mobile devices are now used to store secure information (such as passwords, credit cards, and the like) and because mobile devices are now being used to access remote secure enterprise assets. Moreover, individuals desire to do more and more with their phones electing to eliminate or do less and less with convention computing devices. Still further, as processing migrates to mobile devices, viruses targeted to mobile platforms are on the rise.

Users have a variety of mechanisms that they use to ensure security is enforced on their mobile devices, such as their phones or tablets. One technique is to force a time out when there is inactivity on the device; the user must authenticate to unlock the timed out mobile device. This is generally done via a password or personal identification number (PIN).

Another approach is to password protect specific apps on the mobile device; but, in this case, it is usually the apps that must provide such a functionality as the operating system of the mobile device rarely provides such app-specific security. Additionally, users are less likely to implement security on a per-app bases, instead preferring security for the entire device via the traditional time out and re-authentication approach. There is usability issues associated with time outs.

When people use mobile devices, simple touch actions are best, user input via the keyboard is seen as a failure or a sign of bad design. Most tasks should be done via simple touch or touch and slide, not touch typing via a touch screen keyboard. This creates a problem for security because the device may need to have the user re-authenticate after a period of inactivity, using their password. This timeout can be set for a short or long period of time based on the "security" vs "ease of use" balance. Short timeouts are safer but a major inconvenience to the user; long timeouts have risks but offer a better user experience. For example, if there is a long timeout and the user sets the mobile device down, some else could use it to access his resources without his permission or knowledge.

SUMMARY

Various embodiments of the invention provide techniques resetting mobile touch authentication. In an embodiment, a method for mobile touch authentication reset is presented.

Specifically, a touch profile (TP) of a user is recorded and the TP is compared to a previous TP recorded for the user during a last use by the user accessing the device. Finally, the user is recognized based on the comparison.

DETAILED DESCRIPTION

A "resource" includes a user, service, system, device, directory, data store, groups of users, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

Figure 1:
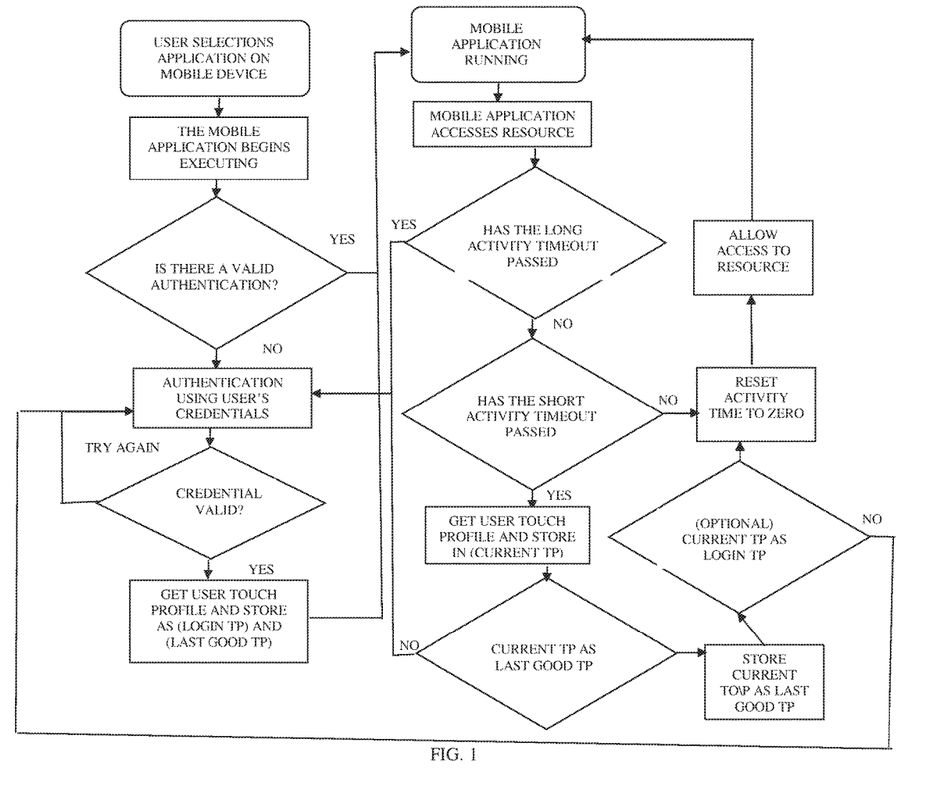
FIG. 1 is a diagram of a technique for mobile touch authentication reset, according to an example embodiment presented herein.

FIG. 1 is a diagram of a technique for mobile touch authentication reset, according to an example embodiment presented herein. The technique is implemented and programmed as executable instructions within memory and/or a non-transitory computer-readable storage medium for execution on one or more processors of a device. In an embodiment, the device is a mobile device, such as but not limited to a mobile phone, a tablet, a wearable device, a laptop, and the like.

In an embodiment, the technique presented is available for download via an app store associated with a variety of operating systems, such as but not limited to iOS, Android, Mobile Windows, Linux, Blackberry, and others.

The techniques herein use inductive touch technology to solve the problems discussed above. With inductive technology when a person touches a touch-enabled device, a sweep of high-to-low frequencies are sent out to measure the capacitive and inductance of the user's touch. Each person has a different pattern or touch signature. This touch signature or "Touch Profile" (TP) can change for individuals and also changes for a same person as time passes. Because the TP changes over time, it is not a good long term authentication factor, but as it turns out, the TP is a great short term authentication factor.

Because a mobile device uses finger touches for most of the user input, a touch-enabled device can gain information on every user touch. The collected information can be used to identity whether a same user is accessing the mobile device or not. When a user first authenticates to the device with his/her credentials (for example using a name and password combination) the device can remember what the user's TP is. The next time a user touches the device it can compare the TP of the user and determine if the user needs to re-authenticate using his/her credentials or whether the TP is good enough as an authentication factor.

One embodiment of the invention uses the TP of a user's current touch and compares that to a TP last registered when the user input his/her credentials for a last successful authentication. If the two TPs are a close match, then a mobile device's time out setting can be extended, and the user will not need to reenter his/her credentials.

For example, consider that Lloyd logs into a service from his mobile device and his TP is stored/recorded. The technique described herein returns a token or cookie that the device stores along with the TP. The next time that Lloyd uses the device a new TP is read and compared to the original TP that was registered and if the two TPs are close enough (via threshold evaluation) a longer timeout is allowed and the new TP is stored. If the new TP is farther from the original TP and the time since last use is greater that the short time out (say 1 minute) the user is prompted for a password; if the TP is close and the timeout is not greater than the long timeout (say 2 hours), the device allows the token or cookie to be used and sent to the server.

So, if Lloyd keeps using (i.e. touching his phone) he will not need to re-login, but if anyone else does they will be forced to re-login (re-authenticate).

The FIG. 1 is a flow diagram showing a possible process flow of some embodiments. It is noted that "==" is used to illustrate that the two TPs match based on a configured parameter.

The techniques herein provide greater usability for users on mobile devices. By being able to have a variable time-out on mobile devices without any additional user input, the user's experience is greatly improved. This is done without decreasing security (in fact security is improved).

Moreover, the techniques here can also allow the difference between the original and current TP to be used to determine the validity of the user. Because TPs change over time there may not need to be any time out at all. If a user waited too long his/her TP would be different and would require the user to enter his/her credentials.

In some cases, the techniques herein can also use web base servers to do a lot more evaluation of the noted TPs. This can include such things as encrypting the TP and other user input.

Figure 2:
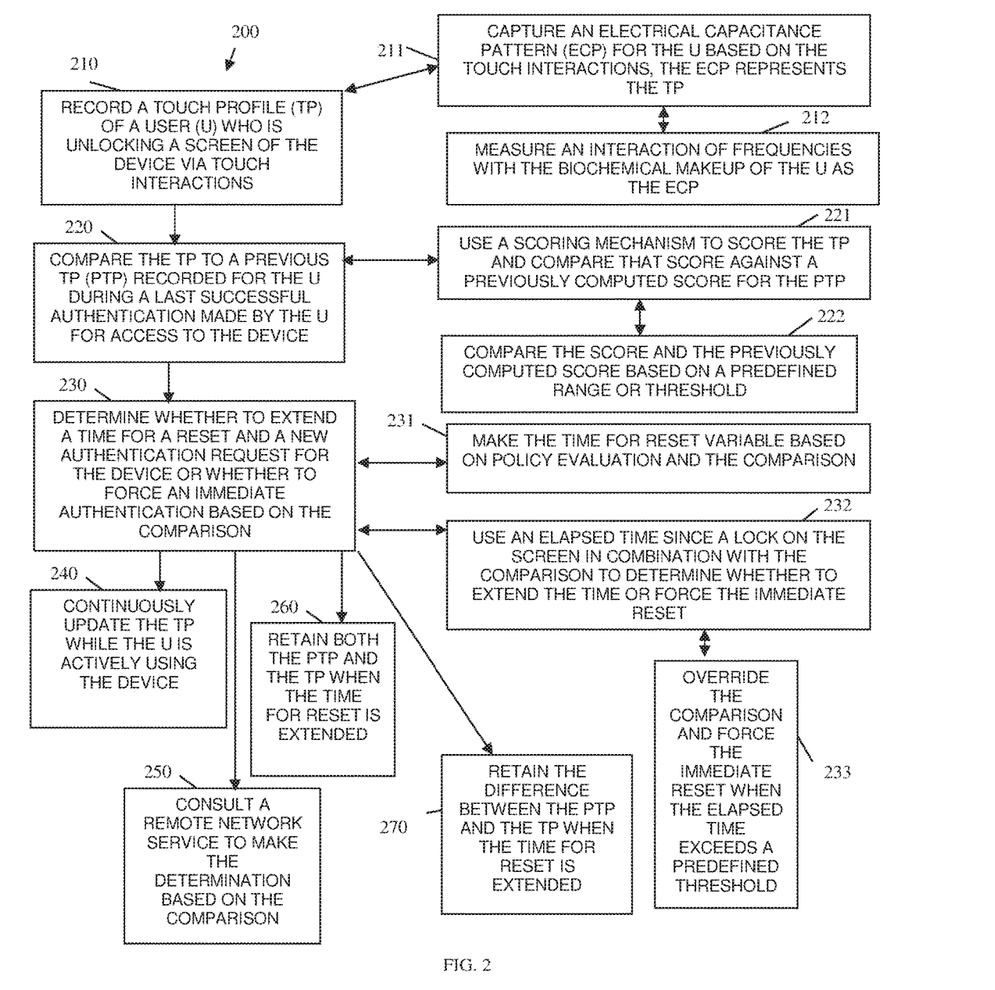
FIG. 2 is a diagram of a method for mobile touch authentication reset, according to an example embodiment presented herein.

FIG. 2 is a diagram of a method 200 for mobile touch authentication reset, according to an example embodiment presented herein. The method 200 (herein after referred to as "TP manager") is implemented, programmed, and resides within memory and/or a non-transitory machine-readable storage medium that executes on one or more processors of a device and is operational over a network. The network may be wired, wireless, or a combination of wired and wireless.

In an embodiment, the device that processes the TP manager is a mobile device, such as but not limited to a phone, a tablet, a laptop, a wearable processing device, and the like.

At 210, the TP manager records a touch profile of a user who is unlocking a screen of a device via touch interactions. So, consider a device that is a phone that is set to time out in 1 minute when there is no activity. Conventionally, when the user accesses the phone again to unlock it, the user is forced to enter a PIN or password based on the fact that the phone locked and therefore timed out.

According to an embodiment, at 211, the TP manager captures an electrical capacitance pattern for the user based on touch interactions. The electrical capacitance pattern represents the touch profile.

Continuing with the embodiment of 211 and at 212, the TP manager measures an interaction of frequencies with the biochemical makeup of the user as the electrical capacitance pattern. That is, the human finger is electronically conductive and the touch screen of the device emits electrical frequencies that are stored in the finger and an individual's biochemistry interacts with those frequencies; this is measured to create the electrical capacitance pattern.

It is noted that there may be other mechanisms to capture and note a touch profile and any such mechanism is intended to fall within the scope of the embodiments presented herein. For example, the pressure of touch may be used to develop the touch profile. Still further, in some cases a fingerprint of the user can be derived by capacitance.

At 220, the TP manager compares the touch profile to a previous touch profile that was recorded for the user during a last successful authentication made by the user to access the device. So, when the user authenticates, a current touch profile for the user is registered and becomes a last or previous touch profile from which other subsequent touch profiles of the user are compared against.

In an embodiment, at 221, the TP manager uses a scoring mechanism to score the touch profile and compare that score against a previously computed score for the previous touch profile. Here, a custom algorithm can use more than a touch profile's value as recorded or captured but can use weights of factors, such as but not limited to, time of day, temperature of the device, temperature of the ambient air surrounding the device, altitude, and other factors.

Continuing with the embodiment of 221 and at 222, the TP manager compares the score and the previously computed score based on a predefined range or threshold.

At 230, the TP manager determines whether to extend a time for a reset and a new authentication request for the device or whether to force an immediate authentication based on the comparison. In other words, rather than using conventional mechanisms to always force an authentication for using the device based on a timeout or lock; the TP manager permits a variable new or authentication request based on comparison of a registered touch profile with a recently captured touch profile when the user unlocks a screen of the device.

In an embodiment, at 231, the TP manager makes the time for reset variable based on policy evaluation and the comparison. So, as stated above, the authentication reset becomes a variable condition that can be used in combination with comparison of the touch profiles and, in this embodiment, evaluation of additional policy conditions (which can be customized).

According to an embodiment, at 232, the TP manager uses an elapsed time since a lock on the screen in combination with the comparison to determine whether to extend the time or force the immediate reset.

So, in one case of 232 and at 233, the TP manager overrides the comparison and forces the immediate reset (and therefore a re-authentication by the user) when the elapsed time exceeds a predefined threshold.

In one situation, at 240, the TP manager continuously updates the registered or previous touch profile of the user while the user is actively using the device. So, as the device is being accessed by the user and during a period in which no screen time out or lock of the device occurs, the touch profile is continuously being noted and updated on behalf of the user.

In another scenario, at 250, the TP manager consults a remote network service to make the determination based on the comparison. This can occur for a variety of reasons. For example, suppose that a remote resource or a vital resource of the device is controlled via the remote network service, such that the remote network service can use a variety of out sourced policy evaluation to decide whether to force a re-authentication by the user. If the remote network service is needed to make the determination, then a re-authentication can be forced when the device is not connected to a network and used just when the device is capable of communicating with the remote network service.

According to another case, at 260, the TP manager retains both the previous touch profile and the touch profile when the time for reset is extended. Here, a series of sets of touch profiles may be noted and standard deviations over time developed for the user, such that perhaps even longer periods of screen locks can still result in not having to force immediate re-authentication in every instance.

In yet another situation, at 270, the TP manager retains the difference between the previous touch profile and the touch profile when the time for reset is extended. So, the difference is what is noted and compared and when that difference is beyond a threshold an immediate re-authentication request (or new authentication request) is forced.

Figure 3:
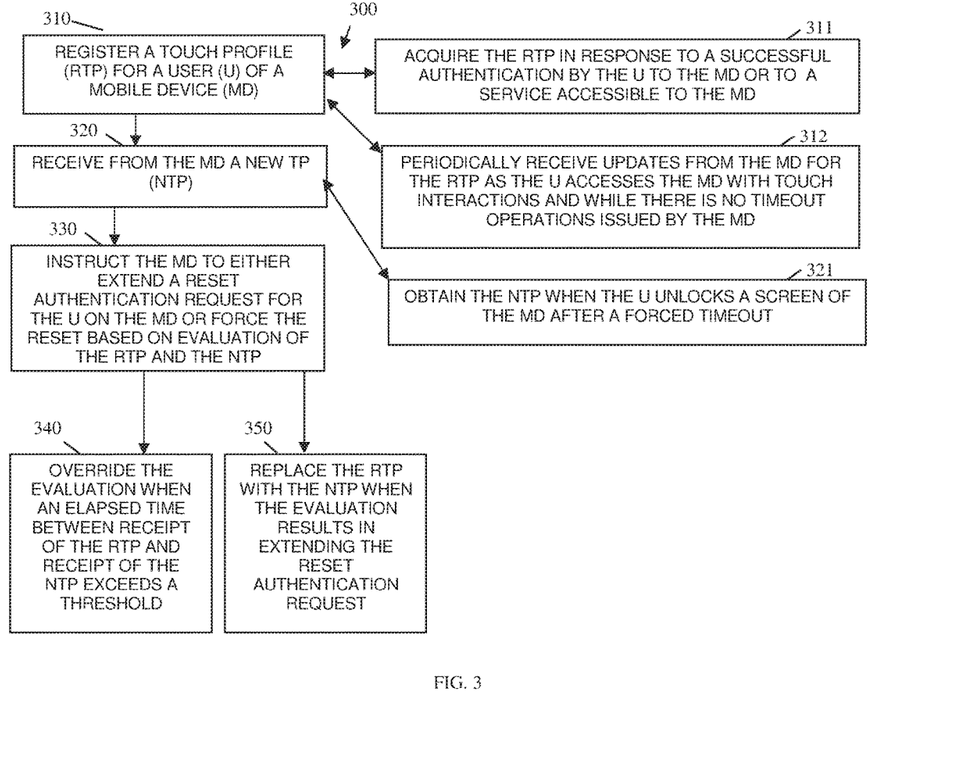
FIG. 3 is a diagram of another method for mobile touch authentication reset, according to an example embodiment.

FIG. 3 is a diagram of another method 300 for mobile touch authentication reset, according to an example embodiment. The method 300 (herein after referred to as "TP controller") is implemented, programmed, and resides within memory and/or a non-transitory machine-readable storage medium that executes on one or more processors of a device and is operational over a network. The network may be wired, wireless, or a combination of wired and wireless.

The TP controller is another and in some ways enhanced perspective of the TP manager described above with respect to the method 200 of the FIG. 2.

Specifically, the processing of the TP controller occurs via a server and remote from the mobile device of the user, whereas the processing of the TP manager of the FIG. 1 occurred (in most instances) on the mobile device. So, from at least this point of view the TP controller differs from the approach of the TP manager represented by the FIG. 1.

At 310, the TP controller registers a touch profile for a user of a mobile device. This can be achieved via an app on the mobile device that securely communicates a specific mobile device identity, a user identity, and a specific touch profile captured for the user.

According to an embodiment, at 311, the TP controller acquires the registered touch profile in response to a successful authentication by the user to the mobile device or to a service accessible to the mobile device. In other words, the authentication required by the user need not be related to access to the entire mobile device; rather, authentication may be related to access to a specific resource (app) on the mobile device. So, suppose the user authenticates locally to his mobile device each time a time out occurs or requires no re-authentication at all after time outs, the evaluation of touch profiles may still be used for re-authentication to specific resources on the mobile device.

In an embodiment, at 312, the TP controller periodically receives updates from the mobile device for the registered touch profile as the user access the mobile device with touch interactions and while there is no timeout operations issued by the mobile device.

At 320, the TP controller receives from the mobile device a new touch profile.

According to an embodiment, at 321 the TP controller obtains the new touch profile when the user unlocks a screen of the mobile device after a forced timeout.

At 330, the TP controller instructs the mobile device to either extend a reset authentication request for the user on the mobile device or force the reset based on evaluation of the registered touch profile and the new touch profile. This can be done based on a difference between the values for the two touch profiles or scores for the two touch profiles, where the difference is compared to a threshold value. Other comparison techniques can be used as well without departing from the embodiments presented herein.

According to an embodiment, at 340, the TP controller overrides the evaluation when an elapsed time between receipt of the registered touch profile and receipt of the new touch profile exceeds a threshold. Here, the elapsed time of a screen lock or time out can be used to override the comparison and force an automatic re-authentication by the user.

In another instance, at 350, the TP controller replaces the registered touch profile with the new touch profile when the evaluation results in extending the reset authentication request. This can also just be permitted for a set number of iterations, such that at some point the user is forced to re-authenticate; the number of iterations can be defined by policy.

It is also noted that when the user does re-authenticate, the touch profile used during that re-authentication is noted and recorded as a last registered touch profile.

Figure 4:
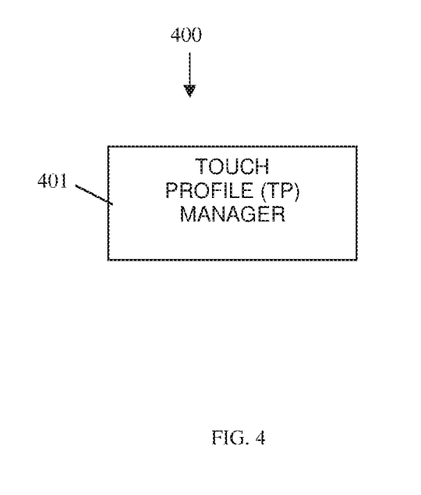
FIG. 4 is a diagram of a mobile touch authentication reset system, according to an embodiment.

FIG. 4 is a diagram of a mobile touch authentication reset system 400, according to an embodiment. The components of the mobile touch authentication reset system 400 are implemented as executable instructions that reside within memory and/or non-transitory computer-readable storage media and those instructions are executed by one or more devices. The components and the devices are operational over a network and the network can be wired, wireless, or a combination of wired and wireless.

According to an embodiment, the mobile touch authentication reset system 400 implements, inter alia, the features of the FIGS. 1-2.

The mobile touch authentication reset system 400 includes a TP manager 401.

The mobile touch authentication reset system 400 includes one or more devices having memory configured with the TP manager 401. Example processing associated with the TP manager 401 was presented above in detail with reference to the FIGS. 1-2.

The TP manager 401 is configured to manage and automatically capture touch profiles of a user of the mobile device and to evaluate based on policy and the touch profiles whether re-authentication is necessitated by the user. This was described in detail above with reference to the FIGS. 1-3.

According to an embodiment, the TP manager 401 is also configured to store a last captured or a last registered touch profile as a token or cookie on the mobile device.

The TP manager 401 can also encrypt the token or cookie on the mobile device. Moreover, the TP manager 401 may remotely store the token or cookie, communication can be encrypted with the remote server as well for added security.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   capturing touch attributes as capacitance and inductance readings when a user is authenticating to a touchscreen of a mobile device with authentication credentials from touches of a finger of the user when the user provides the authentication credentials through the touchscreen;
   comparing the touch attributes to last saved touch attributes that were last saved in a previous authentication performed by the user to access the mobile device and updating the last saved touch attributes as the touch attributes;
   setting a duration for a time until the authentication credentials are to be re-entered by the user through the touchscreen based on the comparing;
   periodically updating the last saved touch attributes for the user as the user touches the touchscreen during operation of the mobile device; and
   variably adjusting the duration for the time based on the periodically updating by increasing the duration or decreasing the duration.

2. The method of claim 1, wherein capturing further includes capturing multiple simultaneous touches from the user through the touchscreen as the authentication credentials are entered.

3. The method of claim 1, wherein comparing further includes scoring the touch attributes and comparing the scored touch attributes against a computed score for the last saved touch attributes.

4. The method of claim 3, wherein scoring further includes comparing a difference between the scored touch attributes and the computed score against a threshold and setting the duration based on the comparison of the difference to the threshold.

5. The method of claim 1, wherein setting further includes setting the duration to a longer period of time as a difference between the touch attributes and the last saved touched attributes grows smaller.

6. The method of claim 1, wherein setting further includes setting the duration to a shorter period of time as a difference between the touch attributes and the last saved touched attributes grows larger.

7. The method of claim 1, wherein setting further includes varying the duration based on a difference between the touch attributes and the last saved touch attributes.

8. The method of claim 1 further comprising, providing access to the mobile device after a lock touchscreen occurs on the mobile device without requiring entry of the authentication credentials when the duration has not yet elapsed.

9. The method of claim 1 further comprising, locking the mobile device when the duration has passed and requiring re-entry of the authentication credentials for access to the mobile device.

10. The method of claim 1 further comprising, extending the duration while the user interacts with the touchscreen based on new touch attributes obtained while the user interacts with the touchscreen and compared against the last saved touch attributes.

11. A method, comprising:
    establishing and periodically updating a time out period for providing authentication credentials for accessing a mobile device based on current touch interactions of a user touching a touchscreen of the mobile device and based on comparisons between the current touch interactions with a touch profile maintained for the user, wherein the touch interactions and the touch profile include capacitance and inductance measures for a finger of the user touching the touchscreen, wherein establishing and periodically updating further includes variably increasing or decreasing the time out period;
    periodically updating the touch profile based on the current touch interactions;
    wherein establishing further includes setting a shorter period of time for the time out period when a difference between a comparison of the current touch interactions and the touch profile grows larger; and
    wherein establishing further includes setting a longer period of time for the time out period when a difference between a comparison of the current touch interactions and the touch profile grows smaller.

12. The method of claim 11 further comprising, forcing a time out before the timeout period when a particular touch interaction is outside a range associated with the touch profile.

13. The method of claim 11 further comprising, locking the mobile device and requesting that the user enter the authentication credentials when the time out period is reached.

14. The method of claim 11, wherein establishing further includes varying the time out period to an extended period of time the longer a user continues to interact with the touchscreen through the current touch interactions.

15. The method of claim 11, wherein periodically updating further includes using the current touch interactions to continually update the touch profile.

16. A mobile device, comprising:
    a processor; and
    a touch profile manager configured to: i) execute on the processor, ii) set a time out for which a user has to enter authentication credentials to unlock the mobile device for access, iii) determine the time out period based on comparisons between current touch interactions of the user with a touchscreen of the mobile device and a touch profile maintained for the user, wherein the current touch interactions and the touch profile include capacitance and inductance measures for a finger of the user touching the touchscreen, iv) update the touch profile based on the current touch interactions, v) continuously update the touch profile based on subsequent touch interactions of the user during operation of the mobile device, and vi periodically update the time out period based on updates to the touch profile by increasing or decreasing the time out period, vii) setting a duration for a time until the authentication credentials are to be re-entered by the user through the touchscreen based on the comparing, and viii) variably adjusting the duration for the time based on the periodically updating by increasing the duration or decreasing the duration.

17. The system of claim 16, wherein the touch profile manager is further configured, in iii), to:
   extend the time out period as a difference between the current touch interactions and the touch profile grows smaller.

18. The system of claim 16, wherein the touch profile manager is further configured, in iii), to:
   shorten the time out period as a difference between the current touch interactions and the touch profile grows larger.

* * * * *

UNITED STATES PATENT AND TRADEMARK OFFICE
CERTIFICATE OF CORRECTION

PATENT NO.        : 10,097,994 B2  
APPLICATION NO.   : 15/068772  
DATED             : October 9, 2018  
INVENTOR(S)       : Burch et al.

Page 1 of 1

It is certified that error appears in the above-identified patent and that said Letters Patent is hereby corrected as shown below:

In the Claims

In Column 9, Line 10, in Claim 16, delete "vi" and insert --vi)-- therefor

Signed and Sealed this  
Twenty-fifth Day of June, 2019

Andrei Iancu  
*Director of the United States Patent and Trademark Office*